Sept. 20, 1966
C. T. PETERSEN
3,273,616
FREESTONE DRUPE PITTER
Filed April 7, 1965
4 Sheets-Sheet 1
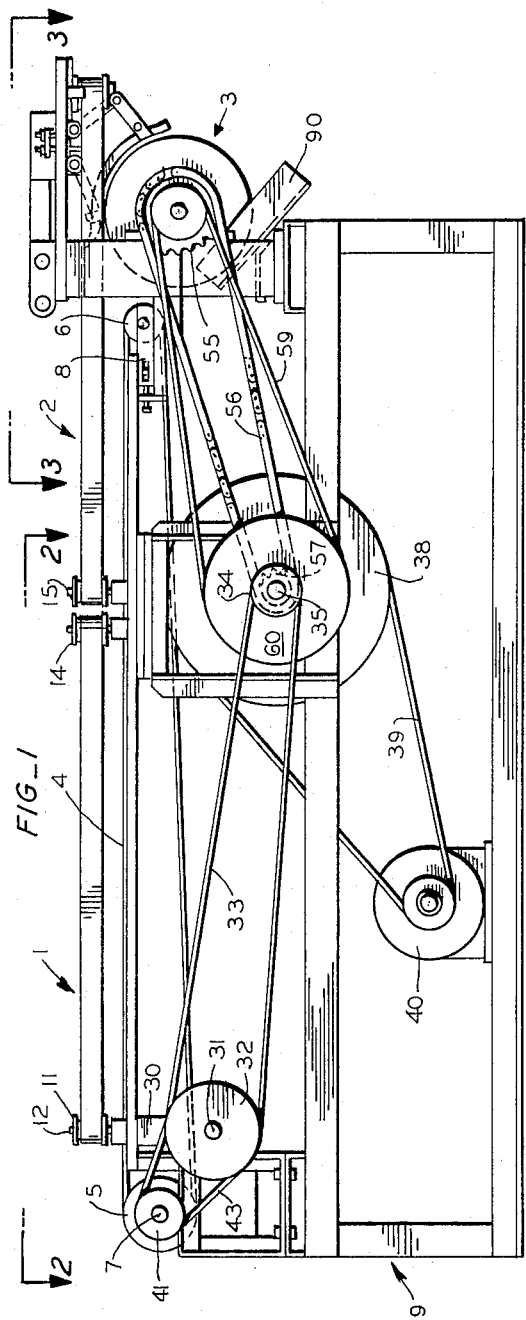
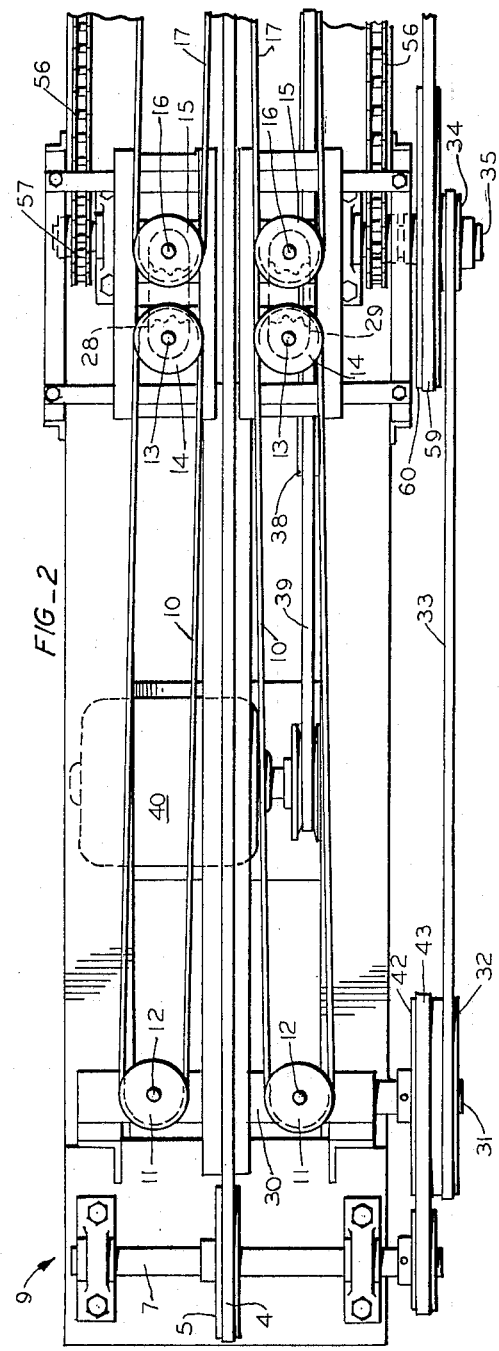
INVENTOR
CARL T. PETERSEN
BY
Boyken, Mohler + Foster
ATTORNEYS Sept. 20, 1966  C. T. PETERSEN  3,273,616
FREESTONE DRUPE PITTER
Filed April 7, 1965  4 Sheets-Sheet 2
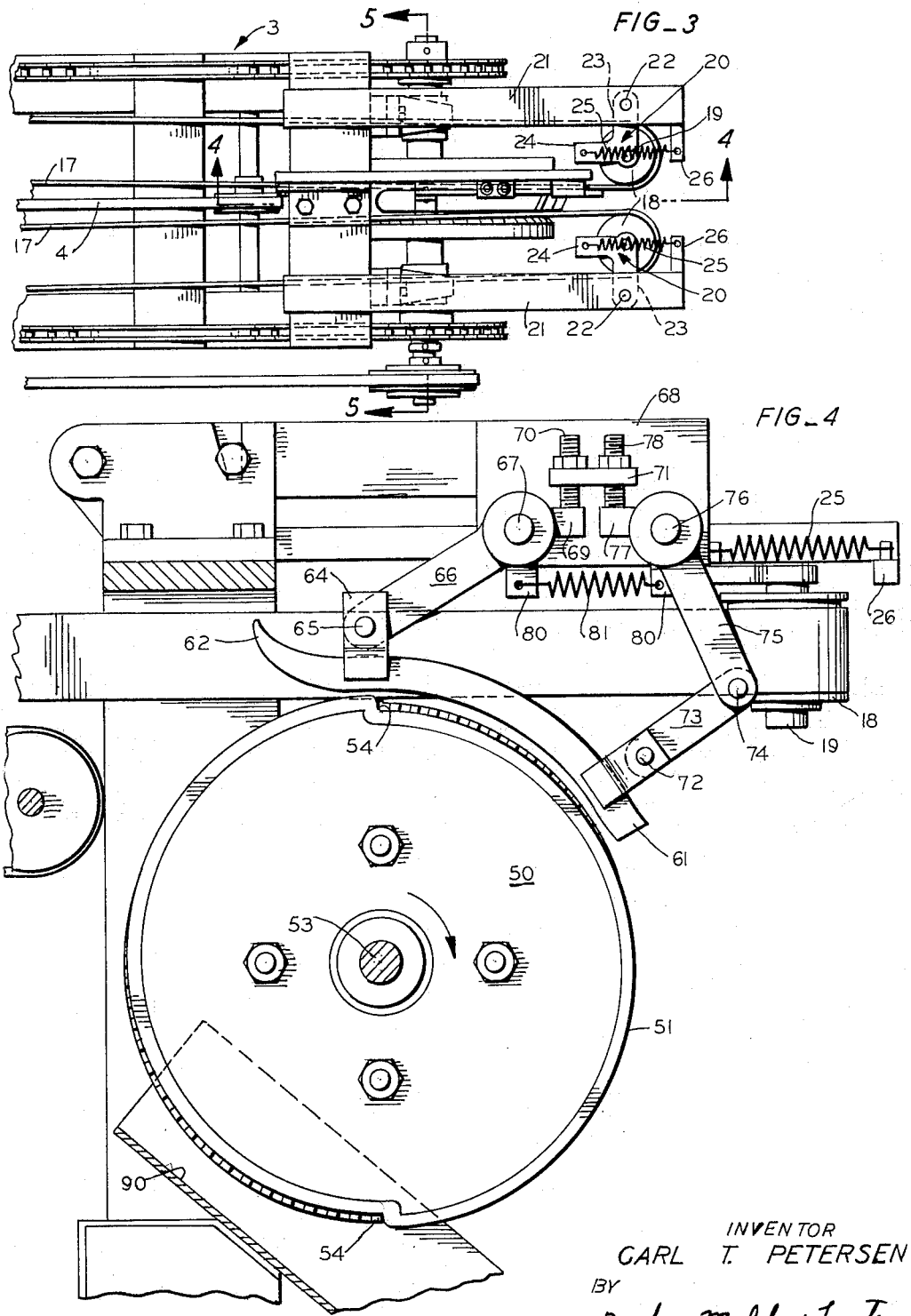
INVENTOR
CARL T. PETERSEN
BY
Boyken, Mohler + Foster
ATTORNEYS

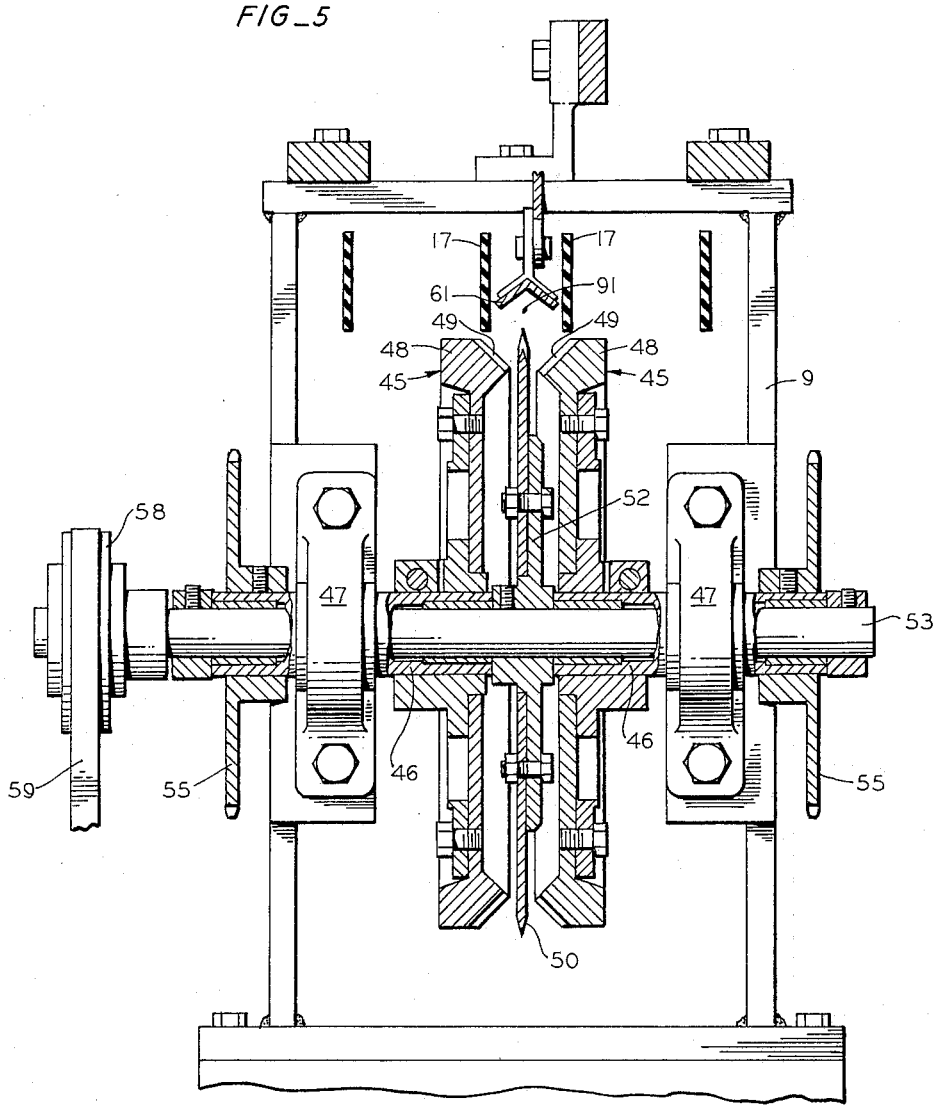

Sept. 20, 1966  C. T. PETERSEN  3,273,616
FREESTONE DRUPE PITTER
Filed April 7, 1965  4 Sheets-Sheet 4
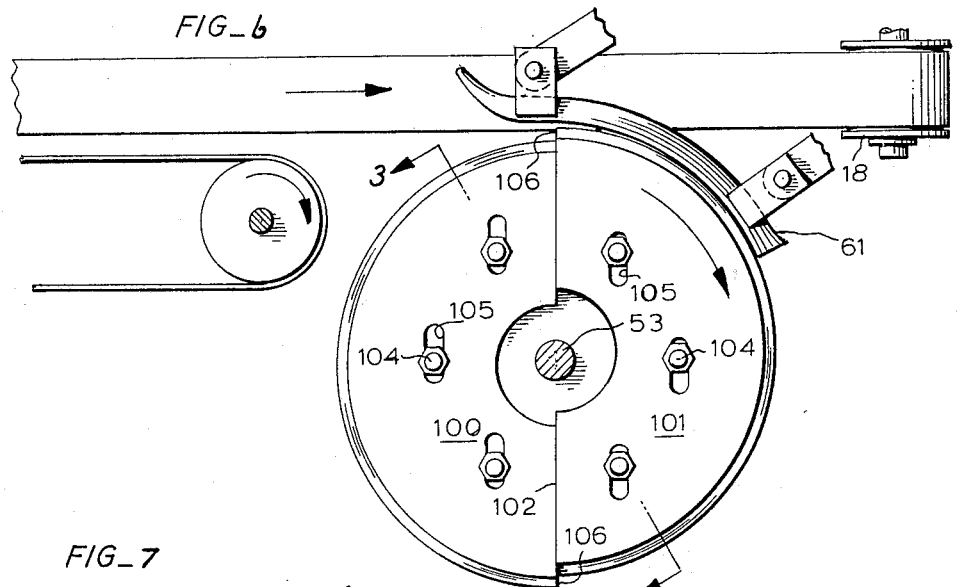
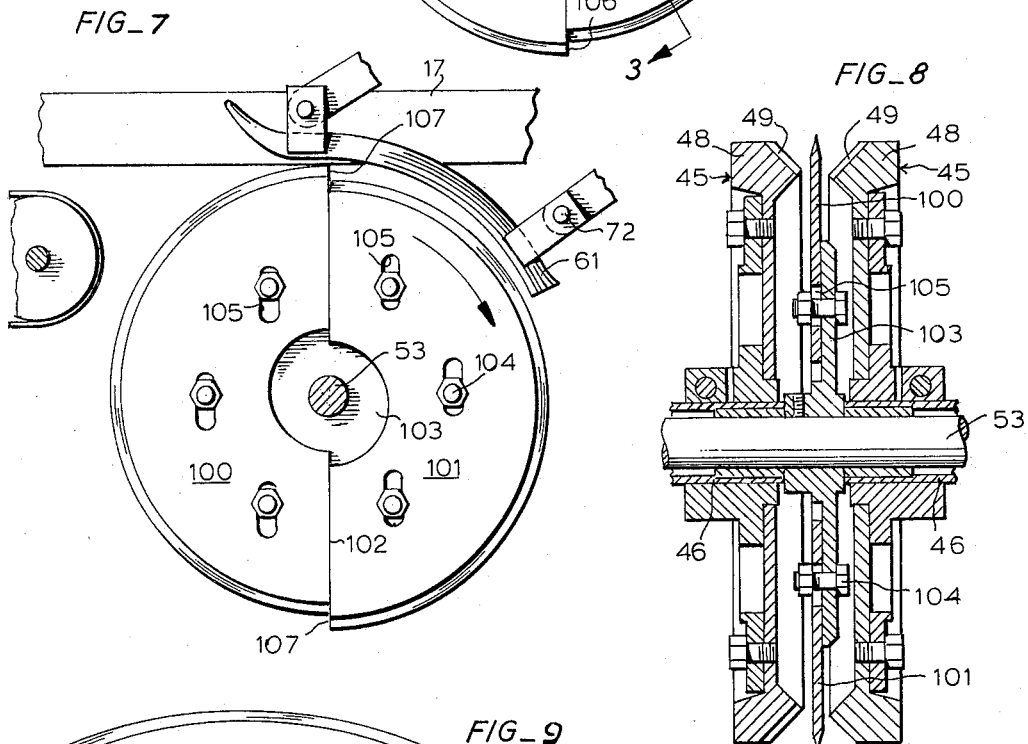
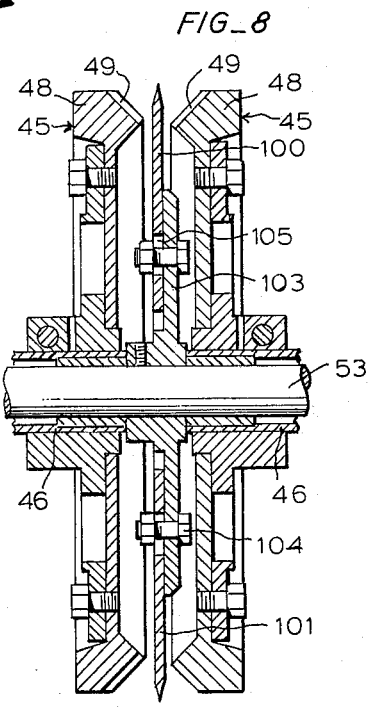
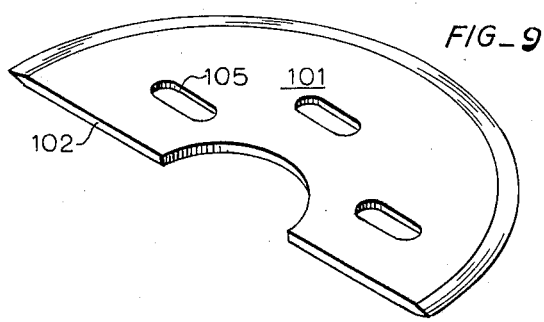
INVENTOR.
CARL T. PETERSEN
BY
Boyken, Mohler + Foster
ATTORNEYS United States Patent Office 3,273,616
Patented Sept. 20, 1966

3,273,616
FREESTONE DRUPE PITTER
Carl T. Petersen, Lafayette, Calif., assignor to Filper Corporation, San Ramon, Calif., a corporation of California
Filed Apr. 7, 1965, Ser. No. 446,279
5 Claims. (Cl. 146—28)

This invention relates to a freestone drupe pitter and has for one of its objects the provision of a pitter that is adapted to more efficiently halve and pit freestone drupes than heretofore.

This is a continuation-in-part of copending application Serial No. 154,989, filed November 27, 1961 by the inventor, Carl T. Petersen now Patent Number 3,228,443.

Heretofore one difficulty in halving and pitting apricots, as an example, has been that of completely freeing the pits from the halves without injury to the halves and reduction in the capacity of the apparatus used.

One object of this invention is to provide a freestone drupe pitter that rapidly halves and pits freestone drupes and that completely separates the pits from the halves of the drupe bodies without injury to said halves.

Heretofore, apricots have been moved past an arcuately extending cutter that bisects the halves to the pit. Sometimes the cutting edge of the cutter is inclined relative to the path of travel of the apricot for causing the pit to move downwardly out of the halves, or the apricots are rotated past a stationary cutter to bisect the body and a stationary obstacle is in the path of the drupe to hold the pit while the halves are carried therepast.

In one form of the invention the apricot is bisected while moving in one direction and the pit is rapidly moved out of the leading end of the body after the cut is made. The body is first cut at the side through which the pit is to be ejected and the halving is accomplished at substantially the same time, the pit moving in the same direction of the body but faster than the latter. Thus the pit will not hang onto either half.

The pitting of ripe undried freestone prunes and other freestone drupes that are more difficult to pit than apricots, is readily accomplished by the present invention.

Other objects and advantages will appear in the description and drawings.

In the drawings, FIG. 1 is a side elevational view of a complete machine.

FIG. 2 is an enlarged top plan view of the feed end of the apparatus, and

FIG. 3 is an enlarged top plan view of the pitting end of the apparatus.

FIG. 4 is an enlarged cross-sectional view taken along line 4—4 of FIG. 3.

FIG. 5 is an enlarged vertical cross-sectional view taken along line 5—5 of FIG. 3.

FIG. 6 is a modified form of the cutter shown in FIG. 4 in one position of adjustment.

FIG. 7 is a view of the cutter of FIG. 6 in another adjusted position.

FIG. 8 is a cross-sectional view along line 8—8 of FIG. 6.

FIG. 9 is a perspective view of one of the blades of the cutter of FIG. 6.

Referring to FIG. 1 of the drawings, the numeral 1 generally designates the feed and drupe orienting portion of the machine. This is at the left hand end of FIG. 1, the direction of movement of the drupes that are to be pitted, being from left to right.

Adjacent to the feed and orienting portion, and to the right of the latter as seen in FIG. 1 is the drupe transfer portion, which is generally designated 2.

To the right of the transfer portion 2, and at the right hand end of the apparatus, as seen in FIG. 1 is the halving and pitting mechanism, that is generally designated 3.

These three portions could be called "stations" i.e., a feed and orienting station, a transfer station and a halving and pitting station. But, in actual practice, the movement of the drupes from left to right is fast and continuous. There is no stopping of the drupes at the stations. The drupes are moved in a single row through the apparatus, in a direction longitudinally of the row.

The portions 1, 2 and the bisecting and pitting mechanism are supported on a suitable frame 9. Said frame 9 is horizontally elongated and includes conventional cross pieces and legs for supporting the working parts spaced above the floor and in the desired relationship to each other.

*Feed and orienting portion 1*

A relatively narrow, horizontally extending belt 4 extends at one end over a pulley 5, that is at the left hand end of the apparatus, as seen in FIGS. 1, 2. The belt 4 extends at its opposite end over a pulley 6 that is carried on the frame within the transfer portion, as will later be explained more in detail.

Pulley 5 is secured on a horizontal shaft 7 that is rotatable in bearings supported on the left hand end of frame 9, and pulley 6 is carried on a shaft that is supported for rotation in adjustable bearings 8, the latter being movable toward the halving and pitting mechanism 3 for tightening said belt 4.

The upper run of belt 4 is supported on a horizontally elongated table against sagging, the latter being supported on frame 9, such structure being conventional where a belt support is required. The right hand end of belt 4, as viewed in FIG. 1, terminates short of the halving and pitting mechanism.

Projecting above belt 4, and spaced at opposite sides thereof, are a pair of horizontally spaced, opposed, endless belts 10 that are respectively supported at their ends for movement about vertical axes.

Pulleys 11 at the left hand end of the frame 9 are supported on the upper ends of vertical shafts 12 (FIG. 2) for rotation about the axes of said shafts upon rotation of the latter.

Vertical shafts 13 at the opposite or right hand ends of belts 10 carry pulleys 14 about which said opposite ends of belts 10 extend.

The right hand ends of belts 10 substantially define the point where the feed and orienting portion 1 ends, and the transfer portion commences.

*Transfer portion 2*

Adjacent to pulleys 14 are a pair of similar pulleys 15, the latter being on the upper ends of vertical shafts 16. Vertically disposed, horizontally extending endless belts 17 extend at one of their ends over pulleys 15, and the opposite ends of said belts 17 extend over pulleys 18 (FIG. 3). Said pulleys 18 are carried on vertical shafts 19 that are at the right hand end of frame 9.

The adjacent opposed runs of belts 17 are generally in longitudinal alignment with the adjacent opposed runs of belts 10. However, the said opposed runs of belts 17 are closer to each other, and extend slightly convergently from pulleys 15 to pulleys 18.

Shafts 19 that support the right hand ends of belts 17, as seen in FIG. 3, extend between and are rotatably carried by horizontally disposed right angle bracket members that are generally designated 20. The bracket members 20 are in vertically opposed pairs with the shafts 19 at the junctures between the angularly extending arms of the bracket members.

Pivots 22 pivotally support the outer ends of one of the corresponding arms 23 of the bracket members 20 to the horizontally extending elongated side frame members 21 of frame 9, with said arms extending toward each other from pivots 22, and the other arms 24 of said bracket members extend from pulley shafts 19 to the left (as seen in FIG. 3) and toward the bisecting and pitting mechanism 3, since said belts 17 actually extend past the bisecting and pitting mechanism from pulleys 15.

Coil spring 25 connect the outer ends of arms 24 (which arms extend toward the bisecting and pitting mechanism) with projections 26 (Fig. 3) that are rigid with the right hand end of frame 9.

By the foregoing structure belts 17 are yieldably held in tension, and their adjacent runs are yieldably held apart a distance to insure difficient frictional engagement with the opposite sides of drupes therebetween to carry drupes across the gap that exists between the bisecting and pitting mechanism, and the drupe supporting belt 4. This is why belts 17 are described as being a transfer portion.

*Driving arrangement*

The lower ends of shafts 13, 16 are supported for rotation in bearings carried by suitable cross frame members on frame 9, and sprocket wheels on the lower ends of shaft 13 are connected by chains 28, 29 (FIG. 2) with similar sprocket wheels on the lower ends of shafts 16.

At the left hand end of the feed and orienting portion 1, the shafts 12 that carry pulleys 11, extend into a gear box 30. Within box 30 suitable gears, not shown, connect the shafts 12 and a drive shaft 31 for driving shafts 12 in the proper direction for moving the adjacent runs of belts 10, 17 toward the pitting mechanism 3.

Shaft 31 carries a pulley 32 that, in turn, is connected by a belt 33 with a pulley 34 on the main drive shaft 35. Shaft 35, in turn, carries a large diameter pulley 38 that is connected by a belt 39 with motor 40 (FIGS. 1, 2).

The shaft 7 that carries the pulley 5 over which the left hand end of the drupe supporting belt 4 extends, also carries a pulley 41. Pulley 41 is connected with a pulley 42 (FIG. 2) by a belt 43. The pulley 42 is secured on shaft 31.

*Orienting action*

The driving arrangement for the belt 4 and belts 10, 17 is such that the belt 4 is driven toward the pitting mechanism 3 at a faster surface speed than that of belts 10, 17. This arrangement results in orienting drupes, such as apricots, that have major and minor axes at right angles to each other so that the minor axes are horizontal and at right angles to belts 10, 17. The sutures of the apricot bodies, and pits, are on the major axis, hence after orientation, said sutures will be in substantially a vertical plane bisecting the space between the adjacent runs of belts 10, 17.

At the left hand end of the machine, belts 10 are spaced apart a greater distance than at pulleys 13, so that the apricots or drupes may be readily fed onto belt 4 between pulleys 11, and as the drupes are carried toward the converging ends of belts 10, the adjacent, slower moving, opposed runs of the belts 10 will engage the opposite sides of the drupes to cause them to position themselves with their sutures in the vertical plane that bisects the space between said opposed runs. This action is the same as described in United States Letters Patent No. 2,745,453 that issued May 15, 1956 to Joseph Perrelli et al., and which is owned by the assignee of the present application.

In the present structure, the drupes are delivered from the right hand ends of belts 10 (as seen in FIG. 2), to between the transfer belts 17, and the latter carry the oriented drupes to the bisecting and pitting mechanism.

*Bisecting and pitting mechanism 3*

The bisecting and pitting mechanism comprises a pair of similar, coaxial, horizontally spaced wheels 45 (FIG. 5) that are centrally secured on the adjacent ends of a coaxial pair of horizontal, hollow shafts 46. Shafts 46, in turn, are supported for rotation in bearings 47 carried by frame 9.

Wheels 45 have rims 48 that are bevelled on generally radially outwardly facing sides to provide slanted surfaces 49 extending convergently toward each other and toward the axis of the shafts 46. These surfaces 49 provide a seat for centering each drupe that is delivered onto the upper sides of the wheels.

Centrally positioned between the wheels 45, and spaced therefrom is a cutter disc 50 (FIG. 5) the outer periphery of which is formed with a pair of generally spirally extending cutting edges 51 (FIG. 4).

The disc 50 is centrally secured on a hub 52 that, in turn, is secured on a central shaft 52 in a position between the adjacent ends of hollow shafts 46.

The spirally extending cutting edges 51 respectively extend half way around the outer peripheral edge of the disc (FIG. 4) and progressively radially inwardly, in the same direction, circumferentially of the disc, from points at opposite sides of the disc that are equal distances from the axis of the shaft 53.

The "inner" ends of the cutting edges are the ends that are closest to the axis of shaft 53, and the outer ends are the ends that are at the above mentioned points, or the ends farthest from said axis. The said outer ends extend sufficient distances radially outwardly of the space between rims 48 on wheels 45 to project into a drupe that is seated on surfaces 49 and past the central horizontal axis of the pit in such drupe.

A circumferentially facing shoulder or surface 54, defines the juncture between each of the adjacent inner and outer ends of the cutting edges 51. The inner end portion of each cutting edge 51 projects a sufficient distance radially outwardly of the space between the closest adjacent surfaces of rims 48 to cut into the body of a drupe seated on surfaces 49 in a plane vertically bisecting each such drupe in the plane of the cutter 50.

The shafts 46 carrying wheels 45 have sprocket wheels 55 (FIG. 5) secured on their outer ends. Sprocket chains 56 (FIG. 2) connect sprocket wheels 55 with sprocket wheels 57 that are on the outer ends of the main drive shaft 35.

A small diameter pulley 58 is secured on one end of shaft 53 on which the cutter disc 50 is secured, and a belt 59 connects this pulley with a much larger diameter pulley 60 secured on shaft 35.

The direction of rotation of both the wheels 45 and cutter 50 is in the same direction, so that their upper portions move in the same direction as the belts 17. The arrow in FIG. 4 indicates this direction of rotation.

Positioned over the surfaces 49 of wheels 45 is an arcuately extending hold-down guide 61. The cross sectional contour of this guide is that of an inverted V (FIG. 5) the center or apex being directly over and spaced above the cutter disc 50.

One end of the hold-down guide 61 is directed generally toward drupes that are being carried between belts 17 to the bisecting and pitting mechanism 3, and said end is curved upwardly, as at 62, so that drupes that are carried by and between belts 17 will pass below said end 62 and onto the seats or surfaces 49 at the uppermost sides of wheels 45.

Said hold-down guide extends from the end portion 62 progressively closer to the outer periphery of wheels 45, and it is supported in this position for yieldable movement of both ends, independently of each other, away from each other, away from the wheels.

At the drupe receiving end of the hold-down guide which is the end 62, a bracket 64, projecting upwardly from said guide, is connected by a pivot 65 with one end of an arm 66. Arm 66 extends slantingly upwardly, and generally in the direction of movement of belts 17, and is pivotally supported on a pivot 67 that is carried by a plate 68 that, in turn, is rigid with the frame of the machine.

An arm 69 is secured to the end of arm 66 that is mounted on pivot 67, and this arm engages a vertically adjustable screw 70 that, in turn, threadedly extends through a bracket 71 secured to plate 68. Thus, the downward movement of the end 62 of the hold-down guide 61 is limited by screw 70.

The opposite or outer end of the hold-down guide 61 is pivotally connected at 72 to one end of a link 73 that extends upwardly from pivot 72 in generally the same direction as arm 66.

The upper end of link 73, is in turn, pivotally connected by a pivot 74 with the lower end of an arm 75, which arm 75 is similar to arm 66, but arm 75 extends generally toward the upper end of arm 66, and the upper end of arm 75 is pivotally supported on a pivot 76 that is alongside pivot 67 and that is also secured to plate 68.

Said upper end of arm 75 has an arm 77 thereon, and arm 77 projects toward arm 69 that is secured to the upper end of arm 66.

A vertical screw 78, similar to screw 70, threadedly extends through the bracket 71 and into engagement with the outer end of arm 77, thereby limiting the upward movement of the arm 77.

Parallel, downwardly projecting arms 80 are respectively connected with arms 66, 75 and project downwardly relative to pivots 67, 76 at right angles to arms 69, 77, and the lower ends of these arms 80 are connected by a spring 81 that yieldably urges arms 66, 75 toward each other, which action, in turn, yieldably holds the arms 69, 77 against the screws 70, 78.

By adjusting the screws 70, 78 the position of the hold-down guide 61 relative to the cutter 50 may be varied to suit conditions, and one end of the guide strip may be adjusted relative to the other and to said cutter.

The arrangement and the structure described enables the guide strip 61 to not only rock about different axes that are parallel to the axis of rotation of wheels 45, but to combine the rocking action with bodily movement of the strip toward and away from the wheel. Such movement actually is a floating action resisted by the yieldable influence of the spring 81, and it enables the maintenance of effective contact between drupes of different shapes and diameters as they are carried by wheel 45 between the hold-down strip and wheels in the direction of rotation of the latter.

It should be noted that in the present combination, the movement of the hold-down strip is relative to the cutter 50, the latter being stationary, except for its rotary movement.

The positive delivery of oriented drupes onto the wheels 45 and below the receiving, or entry end 62 of the hold-down strip 61 without interferences from the cutter 50 is accomplished by having the drupes carried between belts 17 to said entry end of the hold-down strip free from any lower support, such as otherwise might be provided by belt 4.

*Operation*

In operation, assuming apricots to be the drupes to be bisected and pitted, the said apricots are delivered by any suitable means onto the left hand end of belt 4 and between the adjacent runs of belts 10. This can be by any suitable conventional means, such as a conveyor or chute or other feed means.

The space between the adjacent sides of the belts 10 at pulleys 11 is wider than the maximum diameters of the apricots, but upon being deposited on belt 4, the apricots will be carried to the right (as seen in FIGS. 1, 2) and will quickly be engaged at their opposite sides by the opposed sides of the slower moving belts 10. The belts 10 continue to be slightly convergent in direction from left to right, or toward the pulleys 14.

Apricots, generally, have their maximum diameters in the plane of their sutures, and the pits correspond. In pitting them, it is desirable that the body of each apricot be bisected in the plane of its suture.

The differential in speed between belt 4 and belts 10 results in the apricots positioning themselves between belts 10 so their sutures are in a vertical plane extending longitudinally of belt 4 and midway between belts 10. This is the same as described in said U.S. Patent No. 2,745,453.

Upon the apricots reaching the right hand end of the feed and orienting portion 1 they will be oriented, and in their oriented positions they will be delivered to the transfer portion 2, which comprises belts 17 and a portion of belt 4.

Upon each apricot reaching the terminating right had end of belt 4, it will be yieldably held between belts 17 and can rotate about a horizontal axis that is perpendicular to the lengths of belts 17. There is nothing engaging either the upper or lower sides of the apricots until they are carried to a position substantially directly over the cutter 50 and below the entry end portion 62 of guide strip 61, and at that position the lower side of the apricot (at opposite sides of cutter 50) will engage the surfaces 49 of the wheels 45, to effect a rotation of the apricot about its said horizontal axis.

Since the apricot is moved to between the cutter 50 and hold-down guide strip 61 along a line tangential to the cutting edges of the cutter, the latter will initially cut into the lower generally leading surface of the apricot and the apricot will quickly rotate to complete bisection of the body.

The sides of the inverted V-shaped guide strips in combination with the oppositely slanted upper surfaces of the rims 48 on wheels 45 will hold the body of the apricot together during bisection with the cut faces of the bisected halves at opposite sides of the plane of the cutter 50.

Cutter 50 is revolving at a relatively high rate of speed in the same direction as the wheels 45, and which rate is much greater than the rate at which wheels 45 or belts 17 are moved. Consequently, as soon as the apricot is so positioned on wheels 45 that either of the circumferentially facing surfaces 54 on the cutter 50 will engage the trailing end of the pit, the latter is positively and very rapidly moved out of the generally leading end of the bisected apricot, along a line that extends generally downwardly and substantially tangentially of the outer periphery of the cutter. This action is very fast and positive. There is no possible clinging of the pit in either of the halves, and there is no injury to the fruit halves.

The bisected halves, once clear of the guide strip 61 will drop onto a conveyor or chute 90 for being carried to any desired point.

In FIG. 5 it may be noted that the belts 17 actually pass over the wheels 45, and they cooperate with the hold-down guide strip 61 and the upper surfaces of the rims 48 to form a substantially enclosed passageway 91 (FIG. 5) between the upper, lower and lateral sides of which the apricot is held at the point where the latter is delivered onto the wheels 45. And it is at this point where rotation of the apricot very rapidly occurs, and where complete bisection is effected upon substantially one half a revolution of each apricot, and the direction of which revolution is such that the pit will always be moved out of a precut portion.

Referring to the form of the invention shown in FIGS. 6–9 the elements disclosed therein are the same as shown in FIGS. 4, 5, with the exception of the cutter, and the arrangement of the stud bolts that secure it to the hub 52.

Apricots of different varieties have different characteristics insofar as the tenacity with which the pits may tend to cling to the halves, and the manner in which they cling. Also, the type of weather occurring during the development of the apricots causes variations in the manner in which the pits will cling, or tend to cling, or to free themselves from the halves. Thus a variety that may have been difficult to pit one season due to the tendency to cling at the stem end to the halves, may readily loosen the next season.

The cutter shown in FIGS. 6–9 is readily adjustable to any condition. This cutter comprises a pair of identical blade halves 100, 101 having straight adjoining edges 102.

Hub 102 corresponds in every respect to hub 52, except that it is provided with openings for more blade securing bolts than are provided for the bolts that are shown at 95 in FIG. 4 for clamping the blade 50 to hub 52.

The hub 103 is formed with an annular row of equally spaced openings through which bolts 104 extend, and a plurality of these bolts (three being shown for each cutter blade) extend through openings 105 in each blade. Openings 105 are elongated along lines parallel with the adjoining edges 102 of the blades 100, 101.

The outer cutting edges of the blades 100, 101 are adapted to form a continuous circle when the halves are positioned with their circularly extending edges coaxial with the axis of shaft 53. The central portion of the cutter formed by blades 100, 101 is enlarged, however, to enable the blades to be adjusted relative to each other and shaft 53 in the plane of the blades so that one blade may be offset relative to the other in the direction of edges 102. The elongated openings 105 enable such adjustment, and FIG. 6 shows the blades in one adjusted position in which the one edge portion 106 of edge 102 of each cutter half 100, 102 is in a position unobstructedly facing away from the direction of rotation of the cutter, while in FIG. 7 the opposite adjustment is made in which one end portion 107 of the edge 102 of each half unobstructedly faces in the direction of rotation of the cutter. Obviously any degree of adjustment within the limits of slots 105 is possible enabling the cutter to be used to meet many different conditions.

The hold-down 61 will function the same as in FIG. 4 to hold the apricots seated against the surfaces 49 of wheels 48, and when the apricots are so seated the pit in each apricot would be substantially in engagement with the outer edge of the cutter, when the halves 100, 101 are arranged with their circularly extending edges in continuation of each other and coaxial with shaft 53.

In FIG. 7, however, the blades or halves 101, 102 are shifted relatively so that the end portion 107 of each edge 102 will project behind the trailing end of each pit, the same result will occur as in FIG. 4, and the pit will be positively driven ahead of the body of the apricot and out of the latter, thereby precluding any chance of the pit rotating away from the cutter and still clinging to the body, as may occur where circular blades are merely notched or provided with an annular row of teeth along their outer peripheral edges.

By using adjustable blade halves, the degree to which each end portion 107 projects radially outwardly relative to the adjacent blade may vary, hence apricots of different sizes and having different sized pits may be readily pitted without injury to the fruit. Normally the fruit is graded for size in each variety, and as the pits are smaller or larger according to the variety, an adjustment may be accurately made.

When the blades are adjusted as seen in FIG. 6 so that the end portions of edges 102 are trailing relative to the direction of rotation of the blades, the action of the blades is still one in which the pit will be moved, but instead of the pit being sharply driven out of the body of the fruit, it is gently pushed generally radially outwardly of the body of the fruit relative to the axis of the shaft 53. The rate of movement of the cutter blades in either FIGS. 6 or 7, as in the case of FIG. 4 is preferably many times the rate of movement of the wheels 48, and since the apricot is rotating under the influence of the wheels 48 at the same time as the cutter is rotating, the pit will be successively engaged and moved out of the fruit body. The holddown is relatively important in both forms of the invention since it centers the pit over the blade as the apricot or fruit body is rotated, thus supporting the suture of the pit and the cutter blades in the same plane to prevent the blades from glancing off the pit and objectionably tearing the meat.

I claim:

1. In a freestone drupe halver and pitter, the combination of:
   (a) a pair of annular, horizontally disposed, coaxial, members supported for rotation in one direction about their common axis;
   (b) means supporting said members for such rotation;
   (c) means connected with said members for rotating them simultaneously in said one direction;
   (d) the outer peripheral surfaces of said members being bevelled toward their adjacent sides to coact for forming a generally V-shaped seat on the uppermost sides of said members for supporting a whole drupe thereon at spaced points generally at opposite sides of the pit therein;
   (e) a disc coaxial with said annular members disposed between the latter and supported for rotation thereof in the same direction as the direction of rotation of said annular members;
   (f) means connected with said disc for rotating the latter in said one direction at a substantially higher rate of rotation than the rate of rotation of said members;
   (g) circumferentially spaced portions of the peripheral outer edge of said disc projecting radially outwardly of the adjacent closest portion of said bevelled surfaces and having circumferentially facing surfaces facing in the direction of rotation of said disc and extending radially outwardly a sufficient distance to engage the trailing end of a pit in a whole drupe supported on said bevelled surfaces for moving such pit out of the leading end of said drupe.

2. In the combination as defined in claim 5:
   (h) the peripheral outer edge of said disc between said portions being sharpened for cutting into the body of a drupe and extending spirally toward said axis from each portion in a direction opposite to the direction of rotation of said disc.

3. In a freestone drupe halver and pitter that includes a pair of coaxial annular, axially spaced, vertically disposed members having their outer peripheries bevelled on their adjacent sides to cooperate to provide a substantially V-shaped seat in cross-sectional contour, spaced at the apex thereof, for centering an apricot therein, means supporting said members for rotation about their axes in one direction, a hold-down extending over said members spaced thereabove and extending circumferentially of said members for engaging the surfaces of apricots supported on said seat, said hold-down being generally inverted V-shape in cross-sectional contour to engage and center apricots over the space between said members, the improvement that comprises:
   (a) a vertical cutter having a circularly extending outer peripheral cutting edge, and supported in a position between said members for rotation relative to said members about the axis of rotation of the latter;
   (b) said cutter being a pair of semi-circular blades having substantially adjoining edges along a line extending through said axis of rotation;
   (c) means for adjustably securing said blades for rotation together in one direction with said blades similarly offset to opposite sides of said axis of rotation longitudinally of said line to provide a pair of pit engaging portions projecting radially outwardly of the space between said members radially of said axis for successively engaging the pit within an apricot on said seat and for moving such pit out of such apricot.

4. In a structure as defined in claim 3:
   (d) means connected with said members for rotating them together in one direction at a predetermined rate of speed and means connected with said blades for rotating them in the same direction as said members at a substantially higher rate of speed;

(e) said blades being offset relatively to provide end portions of the adjoining edges of said blades at opposite sides of said axis projecting a substantial distance outwardly of said members to engage the trailing end of such pit relative to the direction of rotation of said members.

5. In a freestone drupe bisecting and pitting machine:

(a) a pair of conveyor means in horizontally spaced opposed relation for engaging opposite sides of an apricot and for moving said apricot in one direction along a generally horizontally extending path of travel;

(b) conveyor moving means connected with said pair of conveyor means for so moving the latter;

(c) a vertical cutter having a generally circularly extending outer peripheral cutting edge, and supported for rotation about a horizontal axis and in a position with said edge projecting into the space between the conveyor means of said pair in a vertical plane bisecting the space between said pair of conveyor means for bisecting the body of a drupe between and moved by said pair of conveyor means to the pit of such drupe;

(d) means connected with said cutter for so rotating it;

(e) said cutter comprising a pair of substantially semicircular blades having substantially adjoining edges along a line extending through said axis;

(f) means for adjustably securing said blades for rotation together with said blades similarly offset to opposite sides of said axis longitudinally of said line, to provide a pair of pit engaging portions projecting radially outwardly of said axis for successively engaging a pit within each drupe carried by said pair of conveyor means past said cutter when said cutter is rotated about its axis.

References Cited by the Examiner
UNITED STATES PATENTS

| | | | |
|---|---|---|---|
| 2,745,453 | 5/1956 | Perrelli et al. | 146—28 |
| 2,735,465 | 2/1956 | Kellogg | 146—28 X |
| 2,929,424 | 3/1960 | Amori | 146—28 X |
| 3,087,522 | 4/1963 | Ciraolo | 146—28 X |

ROBERT C. RIORDON, *Primary Examiner.*
WILLIE G. ABERCROMBIE, *Examiner.*